US012748746B2

(12) United States Patent
Park et al.

(10) Patent No.: US 12,748,746 B2
(45) Date of Patent: Sep. 29, 2026

(54) SNAPSHOT ADVANCEMENT FOR DATABASE SYSTEMS

(71) Applicant: Salesforce, Inc., San Francisco, CA (US)

(72) Inventors: Jacob Jonghan Park, Toronto (CA); Benjamin Busjaeger, San Carlos, CA (US); Atish Agrawal, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/040,003

(22) Filed: Jan. 29, 2025

(65) Prior Publication Data

US 2026/0220118 A1 Jul. 30, 2026

(51) Int. Cl.
*G06F 16/23* (2019.01)
*G06F 11/1446* (2026.01)

(52) U.S. Cl.
CPC ...... *G06F 16/2336* (2019.01); *G06F 11/1448* (2013.01); *G06F 2201/80* (2013.01); *G06F 2201/84* (2013.01)

(58) Field of Classification Search
CPC ............. G06F 16/2336; G06F 11/1448; G06F 2201/80; G06F 2201/84
See application file for complete search history.

(56) References Cited

U.S. PATENT DOCUMENTS 11,526,539 B2 12/2022 Busjaeger
11,551,184 B2 1/2023 Acharya
11,650,985 B2 5/2023 Busjaeger
11,695,559 B2 7/2023 Busjaeger
11,783,071 B2 10/2023 Kwong
11,829,398 B2 11/2023 Park
11,892,992 B2 2/2024 Gaydorus
11,940,963 B2 3/2024 Sgroi
12,066,998 B2 8/2024 Kwong
2018/0129693 A1* 5/2018 Chatterjee ........... G06F 16/2329
2022/0391291 A1* 12/2022 Helland .............. G06F 16/2379
2022/0417184 A1 12/2022 Kwong
2025/0094384 A1* 3/2025 Choudhury ............ G06F 16/27
2025/0390398 A1* 12/2025 Rather ................ G06F 11/1469

* cited by examiner

*Primary Examiner* — Cindy Nguyen
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed for managing contention and improving transaction efficiency in distributed database systems through snapshot advancement. A system receives a query defining a first database transaction associated with a first snapshot of a database, where the transaction includes reading and updating a database value. The system evaluates the query against predefined criteria, such as accessing a single database row and deterministically locating the database value, to determine eligibility for snapshot advancement. Upon identifying contention over the database value between the first transaction and a second transaction, the system dynamically advances the transaction to a second snapshot of the database, avoiding a restart. This process involves granting snapshot advancement permission, waiting for a lock held by the second transaction to be released, and using the subsequent snapshot to continue execution. These techniques reduce transaction latency and resource overhead while maintaining consistency and efficiency in high-throughput database environments.

20 Claims, 7 Drawing Sheets

SNAPSHOT ADVANCEMENT FOR DATABASE SYSTEMS

BACKGROUND

Technical Field

This disclosure relates generally to database systems, and more specifically, to techniques for processing high volumes of database transactions.

Description of the Related Art

Distributed database systems enable multiple nodes to process transactions concurrently while maintaining data consistency and accuracy. These systems often rely on mechanisms such as snapshots and locks to coordinate access to shared data. A snapshot represents the state of the database at a specific point in time, ensuring that transactions have a consistent view of the data during execution. Locks are used to control access to shared resources, preventing conflicts when multiple transactions attempt to modify the same data. High-throughput systems can experience significant contention when handling simultaneous transactions, particularly in scenarios involving shared counters or frequently updated values. As a result, effectively managing contention and ensuring transactional integrity remain key challenges in distributed database environments.

DETAILED DESCRIPTION

Figure 1:
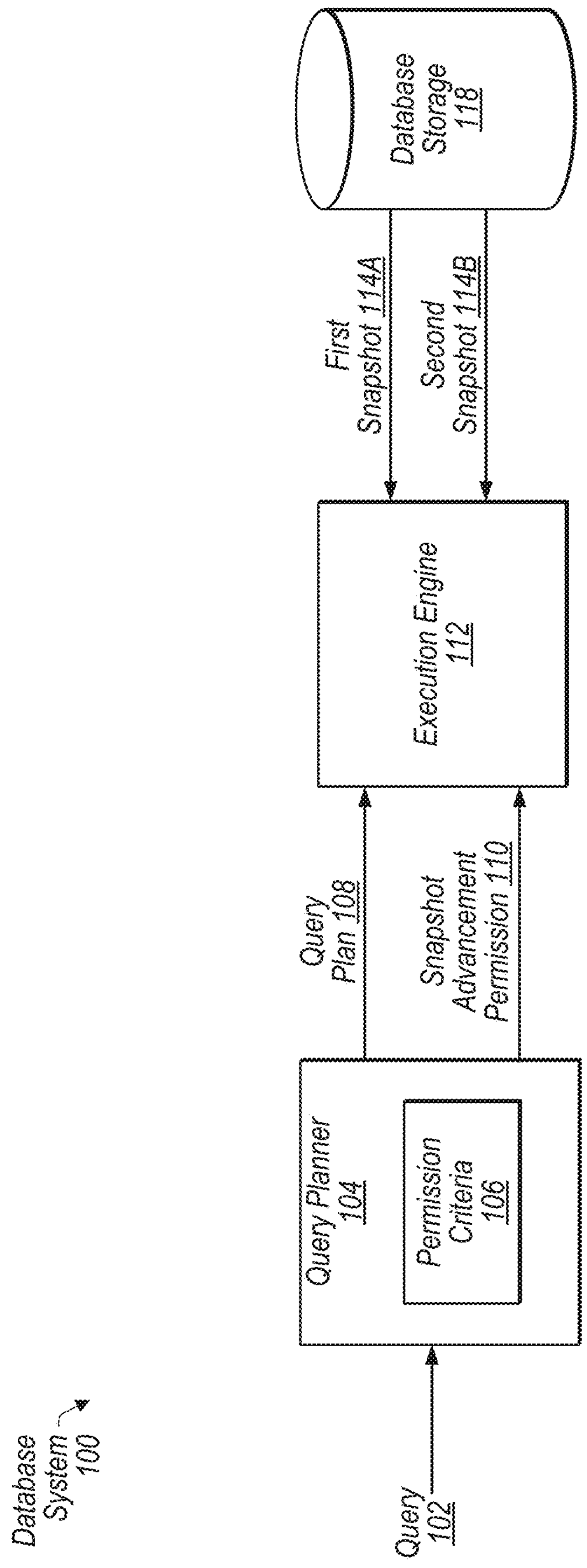
FIG. 1 is a block diagram of one embodiment of a database system implementing snapshot advancement and contention management.

In distributed database systems, database transaction management mechanisms play an important role in maintaining consistency and accuracy when multiple operations are performed concurrently across various nodes. Each database transaction is typically assigned a snapshot of the database, representing a state of the database at a specific point in time. These snapshots allow transactions to operate within a stable and coherent view of the database, even as other operations may modify the underlying data. A recurring challenge arises when multiple transactions contend for access to the same database value, such as a counter or a row in a table. This contention often leads to situations where only one transaction can acquire a lock on the database value, while others are forced to restart. For instance, when a viral video generates millions of view count increments simultaneously, transactions may compete to update the same counter, which may consequently cause frequent restarts and significant delays. These transaction restarts can lead to increased latency, degraded throughput, and excessive resource consumption, as each transaction must reattempt its operations from the beginning. Furthermore, in large-scale systems, such inefficiencies can create cascading delays, impacting related processes and degrading the performance of dependent systems or services. Such inefficiencies are particularly problematic in high-throughput systems, where rapid and frequent updates to shared database values are critical to maintaining responsiveness and user satisfaction.

The present disclosure addresses these challenges by introducing snapshot advancements, which allow database transactions to continue their execution using a subsequent snapshot of the database if contention occurs. Unlike traditional systems that require failed transactions to restart entirely, this mechanism introduces a more adaptive approach. Specifically, a query planner evaluates whether a received query satisfies a predefined set of criteria that permit snapshot advancement. These criteria may include, but are not limited to, determining whether the transaction accesses only a single row of the database and whether the location of the database value being accessed is deterministic, meaning it can be reliably identified and does not change over time. By enforcing such criteria, the query planner determines whether a transaction is eligible for snapshot advancement permission. When this permission is granted, the execution engine is configured to handle contention dynamically. For instance, if a transaction detects that a lock on a database value is held by another transaction, it can wait for the lock to be released and proceed using a subsequent snapshot of the database, thereby avoiding a complete restart. This approach not only reduces resource overhead associated with transaction restarts but also allows the system to adapt to real-time conditions, providing more efficient processing of high-priority or high-throughput transactions.

The present disclosure provides several advantages that enhance the performance, reliability, and scalability of distributed database systems. First, by reducing unnecessary transaction restarts, the system decreases latency and improves overall transaction throughput. This is particularly beneficial for applications requiring rapid updates to shared resources including, but not limited to, real-time analytics platforms, e-commerce systems, or social media services handling high-frequency interactions. Second, the snapshot advancement mechanism facilitates data consistency by allowing transactions to operate on a more up-to-date state of the database, even when contention occurs. This capability is valuable for maintaining the integrity of transactional workflows in dynamic and fast-paced environments. Third, the use of snapshot advancement is managed by the query planner, which evaluates transactions against predefined criteria to determine their suitability for this mechanism. This approach allows transactions that can safely utilize snapshot advancement to proceed without impacting system stability. Additionally, the dynamic lock management system introduced in the present disclosure allows transactions to wait for locks in a resource-efficient manner, reducing computational overhead and enhancing scalability. These innovations address existing challenges and anticipate future demands, offering a robust, scalable, and adaptive solution for managing contention in distributed database environments. By integrating these advancements, the present disclosure provides an enhanced solution for optimizing database operations, fostering efficiency, reliability, and high performance in distributed database systems.

FIG. 1 is a block diagram of one embodiment of a database system implementing snapshot advancement and contention management. As depicted, database system 100 includes query planner 104, execution engine 112, and database storage 118. Query planner 104 evaluates a set of criteria for received query 102, and execution engine 112 identifies contention based on whether a lock is held by another database transaction.

Query 102 may correspond to a database transaction submitted by an external client or application to be processed by database system 100. This transaction could include operations such as reading and updating a database value (e.g., incrementing a counter or modifying a row). Upon receiving query 102, query planner 104 evaluates whether the transaction satisfies permission criteria 106. Permission criteria 106 may include conditions or a set of criteria such as whether the transaction accesses a single row of the database, where the database is represented within database storage 118, and whether the location of the database value being accessed is deterministic. For instance, if query 102 attempts to increment a counter stored in a consistent location within a single row, query planner 104 may determine that the query satisfies permission criteria 106. Those skilled in the art will appreciate additional examples of permission criteria 106. When these criteria are met, query planner 104 outputs query plan 108 and snapshot advancement permission 110 to execution engine 112. Query plan 108 provides the execution steps for query 102, including operations to read, modify, and write the database value, while snapshot advancement permission 110 authorizes execution engine 112 to use a subsequent snapshot of the database (e.g., second snapshot 114B) if contention arises. For example, if execution engine 112 encounters a lock on the database value due to a second transaction holding it, snapshot advancement permission 110 allows execution engine 112 to wait for the lock to be released and then proceed using the most up-to-date snapshot of the database (e.g., second snapshot 114B), as compared to the initial state reflected in first snapshot 114A.

Execution engine 112 interacts with database storage 118, which contains the underlying database rows, data values, and metadata. Database storage 118 maintains multiple snapshots of the database, including first snapshot 114A and second snapshot 114B. First snapshot 114A represents the state of the database at the time query 102 was received, while second snapshot 114B corresponds to the state of the database at a later point in time. For example, if query 102 is attempting to increment a counter and encounters contention because another transaction is updating the same counter, execution engine 112 may use snapshot advancement permission 110 to switch from first snapshot 114A to second snapshot 114B after the lock on the counter is released.

By leveraging snapshot advancement, execution engine 112 avoids unnecessary transaction restarts. For instance, in some embodiments, if contention occurred due to a lock being held by another transaction, query 102 would fail and need to be resubmitted. This may consume additional computational resources and increase latency. With the approach as illustrated in FIG. 1, execution engine 112 can dynamically adjust to contention, acquiring a lock on the database value and using the latest snapshot (e.g., second snapshot 114B) to complete query execution without restarting. This mechanism may be particularly beneficial for high-throughput use cases such as incrementing counters for viral content on social media platforms, where multiple users may simultaneously view and interact with the same content. For instance, if millions of users watch a video and the view count needs to be updated in real-time, database system 100 ensures that the counter is incremented efficiently without the delays caused by frequent transaction restarts.

Figure 2:
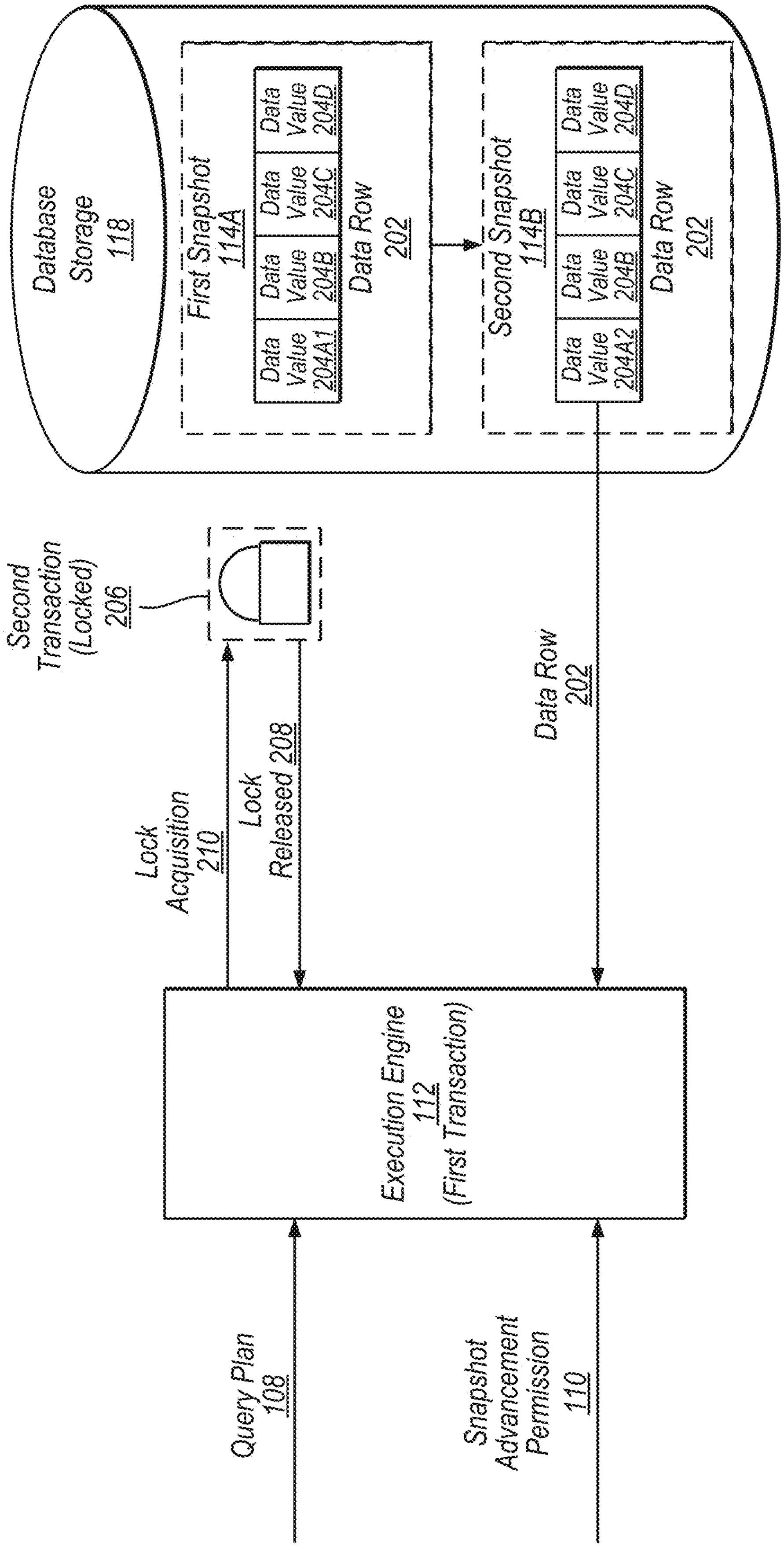
FIG. 2 is a block diagram of one embodiment of an execution engine locking data for a database transaction.

FIG. 2 is a block diagram of one embodiment of an execution engine processing a database transaction when contention occurs. As depicted, execution engine 112 (e.g., for a first transaction) is attempting to acquire a lock for a data value 204A1 of data row 202 within database storage 118 that is currently locked by a second transaction.

Execution engine 112 receives query plan 108 and snapshot advancement permission 110, as described in FIG. 1, to process query 102. Database storage 118 includes data row 202, which is shown across two snapshots: first snapshot 114A and second snapshot 114B. First snapshot 114A represents the state of the database at the time query 102 was initially received, where data row 202 contains multiple data values, such as data value 204A1, 204B, 204C, 204D, etc. In contrast, second snapshot 114B represents the state of the database at a later point in time, where data value 204A1 has been updated to data value 204A2, indicating a modification between the creation of first snapshot 114A and second snapshot 114B. Although FIG. 2 illustrates data row 202 with four data values 204 as an example, it should be understood that data row 202 could contain any number of data values 204 depending on the specific database configuration and context.

As part of its operations, execution engine 112 attempts to acquire a lock for data row 202 to update data value 204A1, represented by lock acquisition 210 in FIG. 2. However, execution engine 112 identifies that data value 204A1 is currently locked by second transaction 206, as illustrated by the lock icon. In this scenario, contention occurs because the lock is held by second transaction 206, preventing execution engine 112 from proceeding immediately.

When contention arises, execution engine 112 leverages snapshot advancement permission 110 to adapt. Specifically, execution engine 112 waits for the lock to be released, as shown by lock released 208. Upon release of the lock by second transaction 206, execution engine 112 acquires the lock and continues processing query 102. During this process, execution engine 112 accesses second snapshot 114B to retrieve the most up-to-date version of data row 202, including the updated data value 204A2. This approach allows execution engine 112 to operate on the current state of the database without requiring a transaction restart.

The ability to dynamically switch from first snapshot 114A to second snapshot 114B when contention is resolved highlights the efficiency of snapshot advancement. In some embodiments, contention often forces transactions to restart, consuming additional computational resources and increasing latency. By contrast, the mechanism illustrated in FIG. 2 and the present disclosure allows execution engine 112 to avoid unnecessary restarts, optimizing transaction processing and reducing resource overhead.

In summary, FIG. 2 illustrates how execution engine 112 interacts with database storage 118 to manage contention and leverage snapshot advancement. By transitioning from first snapshot 114A to second snapshot 114B after acquiring the lock, execution engine 112 maintains efficient transaction processing while minimizing latency. This approach is particularly beneficial in high-throughput scenarios, such as real-time updates to counters for viral content on social media platforms, where multiple transactions may frequently contend for access to the same database values.

Figure 3:
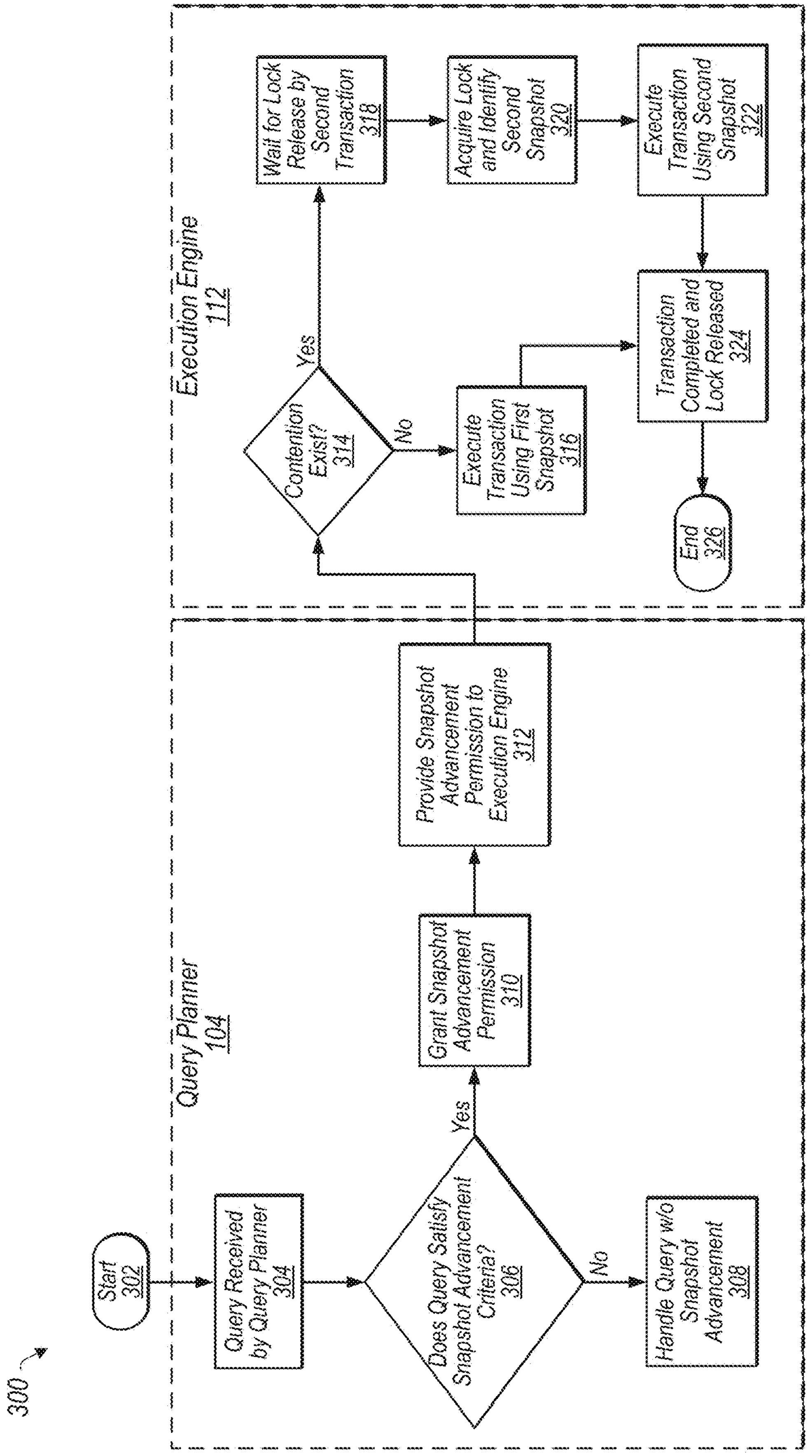
FIG. 3 is a block diagram of one embodiment of a snapshot advancement decision process.

FIG. 3 is a block diagram of one embodiment of a snapshot advancement decision process. As depicted, snapshot advancement decision process 300 shows query planner 104 providing a snapshot advancement permission (e.g., snapshot advancement permission 110) to execution engine 112 if a received query (e.g., query 102) satisfies a set of criteria.

The snapshot advancement decision process 300 begins at start 302. From start 302, process 300 moves to query received by query planner block 304, where query planner 104 receives a query (e.g., query 102) defining a database transaction. At decision block 306 labeled does query satisfy snapshot advancement criteria, query planner 104 evaluates whether the query satisfies snapshot advancement criteria. Examples of snapshot advancement criteria may include, but are not limited to, conditions such as whether the query accesses a single row in the database and whether the database value being accessed is deterministic in its location. Those skilled in the art will appreciate additional examples of snapshot advancement criteria. For example, in some embodiments, the criteria can further include queries with immutable, stable, or non-volatile functions, which can be considered time invariant. As a snapshot is analogous to time, time invariance allows snapshot advancement. An immutable function cannot write to the database, so there is no read-write time dependency preventing a snapshot advancement. A stable function hints that a single statement returns the same output for the same input—i.e., its output is stable relative to its input, so its output is not sensitive to a snapshot. In contrast, a volatile function hints that a single scan can change while it executes, so a non-volatile function hints that a single scan does not change, allowing a snapshot advancement within the scan. In some embodiments, the criteria further includes queries with independent functions. Independent functions execute subqueries in a separate transaction than the main query, so these subqueries execute with their own snapshot. As there is no causal dependency, a query calling an independent function can snapshot advance without worry of impacting the independent function.

If the query does not satisfy the snapshot advancement criteria (i.e., a "no" outcome at decision block 306), process 300 moves to block 308 to handle the query without snapshot advancement, where the query is executed such as by restarting the transaction in the event of contention. If the query does satisfy the snapshot advancement criteria (i.e., a "yes" outcome at decision block 306), process 300 advances to block 310 to grant snapshot advancement permission, where query planner 104 grants permission for snapshot advancement. Process 300 then proceeds to block 312 to provide snapshot advancement permission to execution engine, where query planner 104 transmits the snapshot advancement permission, along with the query plan, to execution engine 112.

Upon receiving the snapshot advancement permission and query plan, execution engine 112 begins processing the query. At decision block 314, execution engine 112 evaluates whether contention exists for the database value associated with the transaction. Contention may occur if another transaction has already acquired a lock on the database value (e.g., second transaction 206 has already acquired a lock before the first transaction as depicted in FIG. 2).

If no contention exists (i.e., a "no" outcome at decision block 314), process 300 proceeds to block 316 to execute transaction using first snapshot, where execution engine 112 performs the transaction using the first snapshot of the database (e.g., first snapshot 114A). Upon completing the transaction, execution engine 112 releases the lock, as shown in transaction completed and lock released block 324. Process 300 then concludes at end block 326.

If contention exists (i.e., a "yes" outcome at decision block 314), process 300 follows a different path. Execution engine 112 waits for the lock to be released by the conflicting transaction (e.g., second transaction 206), as shown in block 318 to wait for lock release by second transaction. Once the lock is released, process 300 advances to block 320 to acquire lock and identify second snapshot, where execution engine 112 acquires the lock on the database value and identifies a subsequent snapshot of the database (e.g., second snapshot 114B) to continue the transaction. Process 300 then moves to block 322 to execute the transaction using a second snapshot, where execution engine 112 performs the transaction using the updated snapshot. Upon completion, execution engine 112 releases the lock, as shown in transaction completed and lock released block 324, and process 300 concludes at end block 326.

Figure 4A:
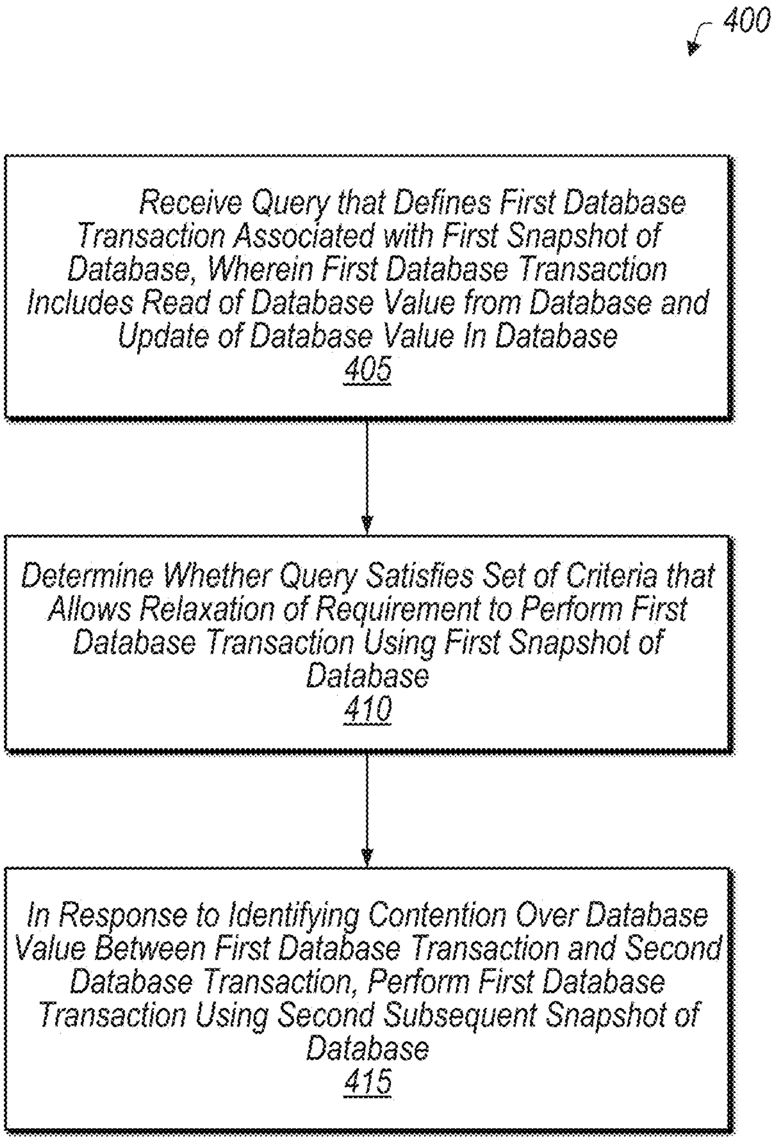
FIGS. 4A, 4B, and 4C are flow diagrams illustrating example methods that implement techniques described herein.

FIG. 4A depicts a flow diagram of a method 400. Method 400 is one embodiment of a method that is performed by a computing system that implements snapshot advancement and contention management as depicted in database system 100. In various embodiments, method 400 may be performed by executing program instructions stored on a non-transitory computer-readable storage medium. In some embodiments, method 400 includes more or fewer steps than shown.

Method 400 begins in step 405 with the computing system receiving a query that defines a first database transaction associated with a first snapshot of a database. For example, query planner 104 of database system 100 may receive a query (e.g., query 102) from an external client or application. The query may define operations such as reading and updating a database value (e.g., incrementing a counter or modifying a row) associated with the first snapshot of the database, where the snapshot represents a consistent state of the database at a specific point in time. In some embodiments, the first database transaction includes a read of a database value from the database and an update of the database value in the database. For example, the transaction may involve incrementing a counter stored in a specific row of the database, such as a view count for a video or a sales count for a product. The read operation retrieves the current value of the counter (e.g., "100"), while the update operation modifies the counter by incrementing its value (e.g., updating it to "101"). These operations are performed within the context of the first snapshot of the database, ensuring that the transaction operates on a consistent and coherent view of the data at a specific point in time.

In step 410, method 400 continues with the computing system determining whether the query satisfies a set of criteria that allows a relaxation of a requirement to perform the first database transaction using the first snapshot of the database. For example, the computing system, such as query planner 104, may evaluate the query (e.g., query 102) to determine if it accesses a single row of the database and whether the location of the database value being accessed is deterministic. For instance, a query that increments a counter stored in a specific row, where the location of the counter is fixed and does not change over time, may meet these criteria. By contrast, queries that involve multiple rows, join operations, or non-deterministic locations may fail to satisfy the criteria. If the query satisfies these conditions, the query planner may proceed to grant snapshot advancement permission, allowing the transaction to adapt dynamically in the event of contention.

In step 415, method 400 continues with the computing system, in response to identifying a contention over the database value between the first database transaction and a second database transaction, performing the first database transaction using a second subsequent snapshot of the database. For example, execution engine 112 may detect that a lock on the database value associated with the first snapshot is currently held by the second database transaction, as depicted in FIG. 2. Upon identifying this contention, execution engine 112 may utilize snapshot advancement permission (e.g., snapshot advancement permission 110) granted by query planner 104 to wait for the lock to be released by the second transaction. Once the lock is released, execution engine 112 acquires the lock and transitions to using the second snapshot (e.g., second snapshot 114B), which reflects the most up-to-date state of the database, to continue processing the first transaction. This approach avoids restarting the transaction from the beginning, reduces resource overhead, and ensures that the transaction operates on a consistent and current state of the database. For instance, if the first transaction involves incrementing a counter, execution engine 112 updates the counter using the second snapshot after resolving the contention.

In various embodiments, method 400 includes the computing system identifying the contention over the database value includes determining whether a lock associated with the database value has already been acquired by the second database transaction. For example, execution engine 112 may evaluate whether a lock, representing exclusive access to the database value, is held by another transaction (e.g., second transaction 206 as depicted in FIG. 2). This determination may involve querying the lock manager or another component of database storage 118 to check the current status of the lock associated with the database value. If the lock is found to be held by the second transaction, execution engine 112 identifies this condition as contention. For instance, when the first transaction attempts to update a data row 202 containing data value 204A1, execution engine 112 detects that the lock is already acquired by the second transaction, thereby preventing immediate access to the data value and triggering contention handling, such as waiting for the lock to be released and proceeding with snapshot advancement.

In various embodiments, method 400 includes the computing system, in response to determining that the lock associated with the database value has already been acquired by the second database transaction, waiting for the lock to be released by the second database transaction and acquiring the lock by the first database transaction upon release of the lock, wherein the second subsequent snapshot of the database is identified based on when the lock is acquired by the first database transaction. For example, execution engine 112 may pause processing the first database transaction upon identifying that a lock on data value 204A1 in data row 202 is held by second transaction 206 (e.g., as shown in FIG. 2). Execution engine 112 waits for second transaction 206 to release the lock (e.g., lock released 208) and subsequently acquires the lock once it is available. At this point, execution engine 112 identifies second snapshot 114B as the appropriate snapshot to continue the first database transaction. For instance, second snapshot 114B corresponds to the state of the database at the moment the lock is acquired, reflecting the most up-to-date data values, such as an updated version of data value 204A1 (e.g., now data value 204A2). In various embodiments, method 400 further includes the computing system releasing the lock by the first database transaction upon completion of the first database transaction. For example, execution engine 112 releases the lock on data value 204A2 in data row 202 after completing the update operation, allowing other transactions to acquire the lock and access the database value as needed.

In various embodiments, the set of criteria comprises a first requirement that the first database transaction accesses a single row of the database that includes the database value. For example, query planner 104 may evaluate query 102 to confirm that the database transaction involves operations confined to a single row within data row 202 in database storage 118, such as reading and updating data value 204A1, without requiring access to multiple rows or complex data structures. In various embodiments, the set of criteria comprises a second requirement that the first database transaction is deterministic with respect to the location of the database value being accessed. For example, query planner 104 may evaluate query 102 to confirm that the database value being accessed, such as data value 204A1 in data row 202 of database storage 118, has a fixed and predictable location that does not vary over time or across different executions of the transaction. In various embodiments, the set of criteria is determined by a query planner of the database prior to performing the first database transaction. For example, query planner 104 may analyze query 102 to assess whether it satisfies predefined criteria, such as accessing a single row and having a deterministic location for the database value. Based on this analysis, query planner 104 may decide whether to grant snapshot advancement permission 110 to execution engine 112 before initiating the first database transaction.

In various embodiments, method 400 includes the computing system granting, via the query planner, a snapshot advancement permission to an execution engine of the database, wherein the execution engine performs the first database transaction using the second subsequent snapshot of the database. For example, query planner 104 may evaluate query 102 against permission criteria 106 and, upon determining that the criteria are satisfied, output snapshot advancement permission 110 to execution engine 112. This permission enables execution engine 112 to handle contention dynamically by switching to a second subsequent snapshot of the database (e.g., second snapshot 114B) to complete the first database transaction efficiently.

In various embodiments, method 400 includes the computing system receiving a second query that defines a third database transaction, determining that the second query does not satisfy the set of criteria, and in response to identifying a second contention between the third database transaction and a fourth database transaction, restarting the third database transaction. In various embodiments, the restarting the third database transaction includes indicating to an application layer that supplied the second query to resubmit the second query. For example, query planner 104 may receive a second query associated with a third database transaction. Upon evaluating the second query against permission criteria 106, query planner 104 may determine that the criteria are not satisfied (e.g., the transaction accesses multiple rows or involves non-deterministic database values). As a result, snapshot advancement permission is not granted. If a contention arises between the third database transaction and a fourth database transaction (e.g., both attempting to modify the same database value), the third transaction may fail due to the lack of snapshot advancement permission. In such cases, execution engine 112 may indicate the failure to an application layer, prompting the application to resubmit the second query to restart the third transaction from the beginning.

Figure 4B:
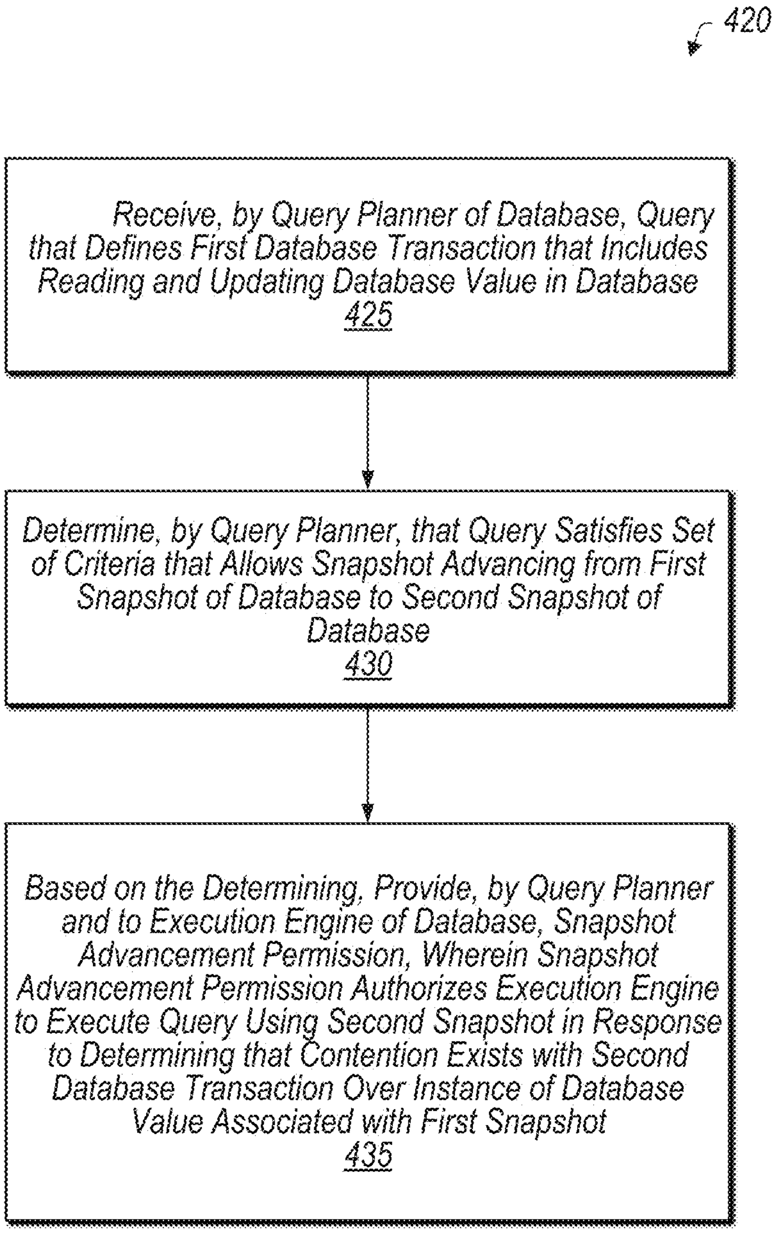

FIG. 4B depicts a flow diagram of a method 420. Method 420 is one embodiment of a method that is performed by a computing system that implements snapshot advancement and contention management as depicted in database system 100. In various embodiments, method 420 may be performed by executing program instructions stored on a non-transitory computer-readable storage medium. In some embodiments, method 420 includes more or fewer steps than shown.

Method 420 begins in step 425 with the computing system receiving, by a query planner of a database, a query that defines a first database transaction that includes reading and updating a database value in the database receiving, by a query planner of a database, a query that defines a first database transaction that includes reading and updating a database value in the database. For example, query planner 104 may receive query 102, which defines a database transaction involving operations such as reading a current value (e.g., a counter or table row) from database storage 118 and updating that value based on the requirements of the transaction. This process enables the query planner to evaluate the transaction and generate the appropriate plan for execution.

In step 430, method 420 continues with the computing system determining, by the query planner, that the query satisfies a set of criteria that allows a snapshot advancing from a first snapshot of the database to a second snapshot of the database. For example, query planner 104 may evaluate permission criteria 106 to determine whether the query accesses a single row in database storage 118 and whether the location of the database value being accessed is deterministic. If these conditions are satisfied, the query planner determines that the transaction is eligible for snapshot advancement, allowing it to proceed efficiently even in the presence of contention.

In step 435, method 420 continues with the computing system, based on the determining, providing, by the query planner and to an execution engine of the database, a snapshot advancement permission, wherein the snapshot advancement permission authorizes the execution engine to execute the query using the second snapshot in response to determining that a contention exists with a second database transaction over an instance of the database value associated with the first snapshot. For example, query planner 104 may output snapshot advancement permission 110 along with query plan 108 to execution engine 112. Snapshot advancement permission 110 enables execution engine 112 to dynamically adapt to contention by waiting for a lock on the database value to be released and proceeding with the transaction using second snapshot 114B, which reflects the most up-to-date state of the database.

Figure 4C:
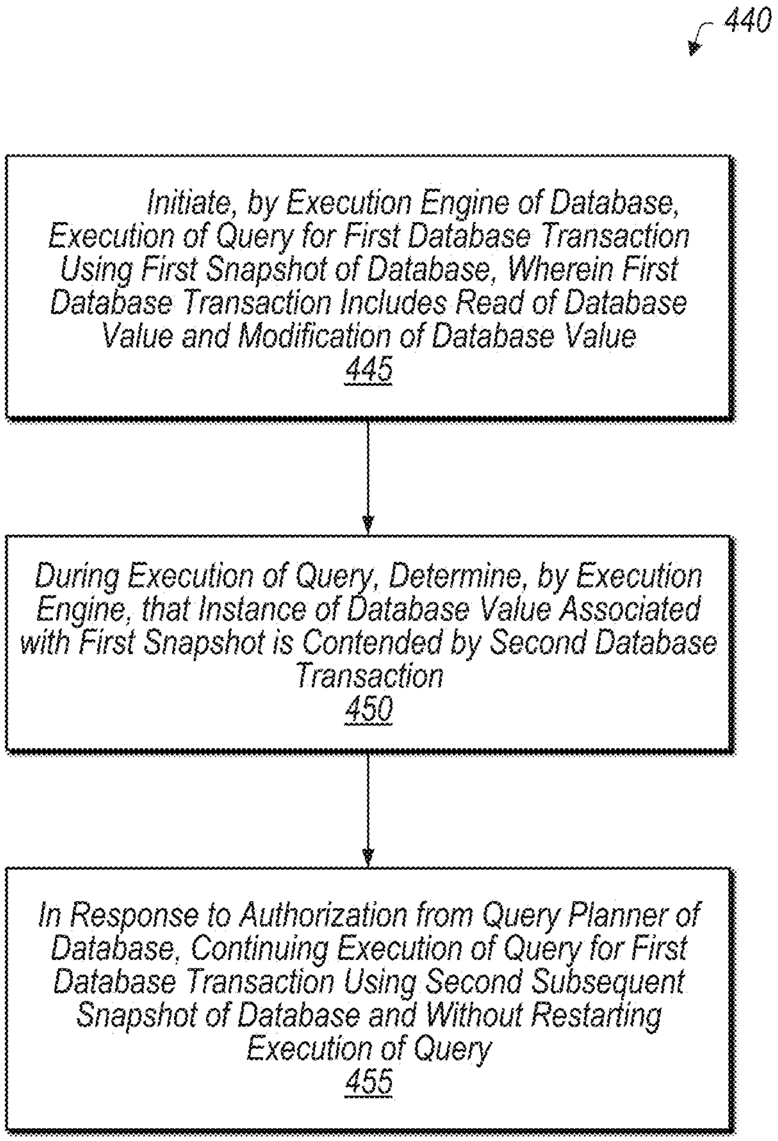

FIG. 4C depicts a flow diagram of a method 440. Method 440 is one embodiment of a method that is performed by a computing system that implements snapshot advancement and contention management as depicted in database system 100. In various embodiments, method 440 may be performed by executing program instructions stored on a non-transitory computer-readable storage medium. In some embodiments, method 440 includes more or fewer steps than shown.

Method 440 begins in step 445 with the computing system initiating, by an execution engine of a database, an execution of a query for a first database transaction using a first snapshot of the database, wherein the first database transaction includes a read of a database value and a modification of the database value. For example, execution engine 112 may receive query plan 108 and snapshot advancement permission 110 from query planner 104. Using first snapshot 114A, execution engine 112 begins executing the query by retrieving a database value (e.g., data value 204A1) from data row 202 and performing a modification, such as incrementing a counter or updating a field in the database. This step initiates the process of handling the database transaction while maintaining a consistent view of the database state provided by first snapshot 114A.

In step 450, method 440 continues with the computing system during the execution of the query, determining, by the execution engine, that an instance of the database value associated with the first snapshot is contended by a second database transaction. For example, execution engine 112 may attempt to acquire a lock on data value 204A1 within first snapshot 114A but identify that the lock is already held by second transaction 206. This contention indicates that the second transaction is modifying or accessing the same data value, preventing execution engine 112 from proceeding immediately with the current transaction. Such contention scenarios often arise in high-throughput systems when multiple transactions target the same frequently accessed data, such as counters or shared records.

In step 455, method 440 continues with the computing system, in response to an authorization from a query planner of the database, continuing the execution of the query for the first database transaction using a second subsequent snapshot of the database and without restarting the execution of the query. For example, upon receiving snapshot advancement permission 110 from query planner 104, execution engine 112 waits for the lock on the contended data value (e.g., 204A1) to be released. Once the lock is released, execution engine 112 acquires the lock and transitions to using second snapshot 114B, which reflects the updated state of the database. By leveraging this subsequent snapshot, execution engine 112 can resume and complete the transaction without restarting, thereby reducing latency and computational overhead in high-throughput distributed systems.

Exemplary Multi-Tenant Database System

Figure 5:
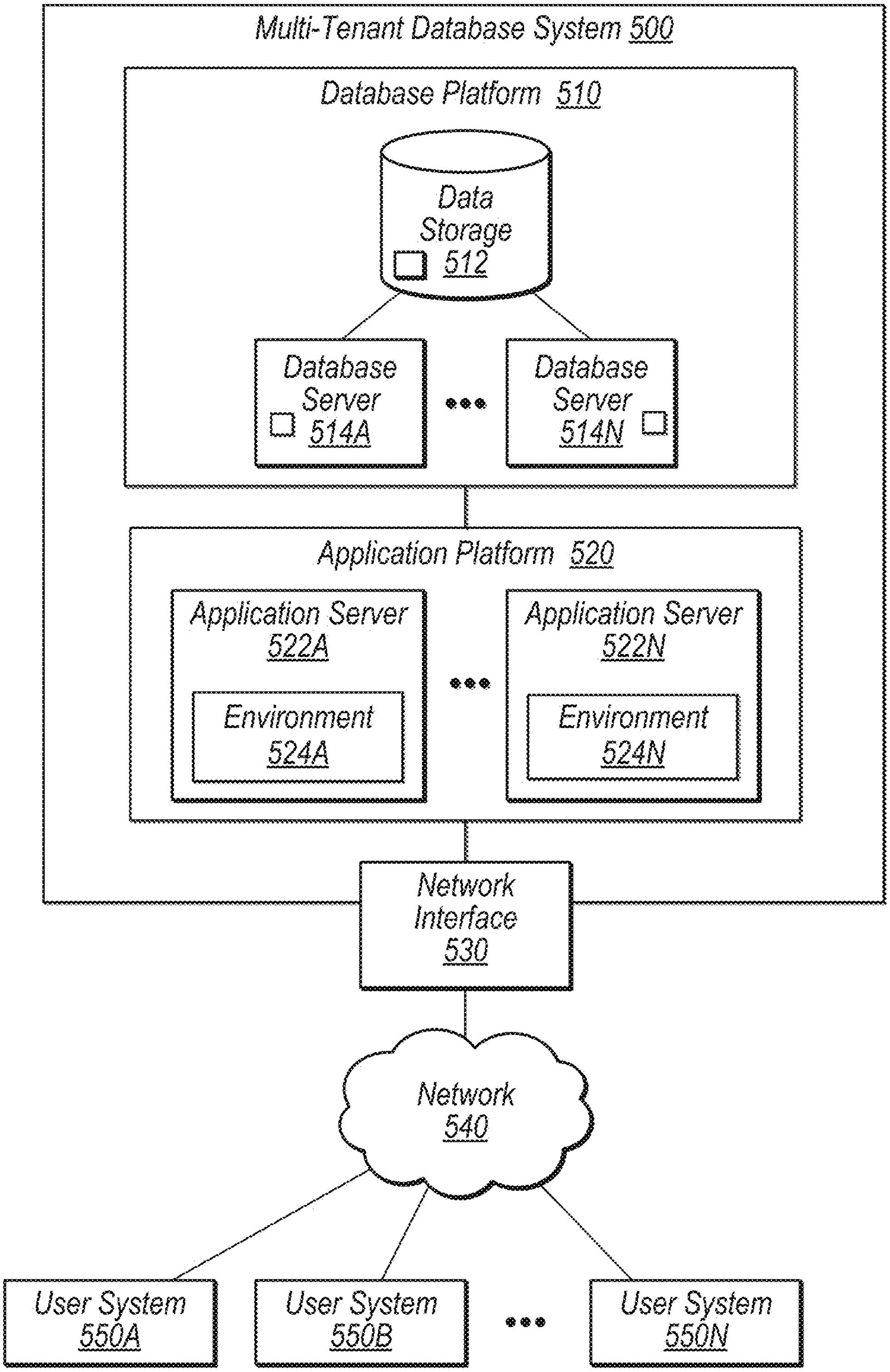
FIG. 5 is a block diagram illustrating one embodiment of an exemplary multi-tenant system for implementing various systems described herein.

Turning now to FIG. 5, an exemplary multi-tenant database system (MTS) 500, which may implement functionality of database system 100 as illustrated above with respect to FIG. 1, is depicted. In the illustrated embodiment, MTS 500 includes a database platform 510, an application platform 520, and a network interface 530 connected to a network 540. Database platform 510 includes a data storage 512 and a set of database servers 514A-N that interact with data storage 512, and application platform 520 includes a set of application servers 522A-N having respective environments 524. In the illustrated embodiment, MTS 500 is connected to various user systems 550A-N through network 540. In other embodiments, techniques of this disclosure are implemented in non-multi-tenant environments such as client/server environments, cloud computing environments, clustered computers, etc.

MTS 500, in various embodiments, is a set of computer systems that together provide various services to users (or sets of users alternatively referred to as "tenants") that interact with MTS 500. In some embodiments, MTS 500 implements a customer relationship management (CRM) system that provides mechanism for tenants (e.g., companies, government bodies, etc.) to manage their relationships and interactions with customers and potential customers. For example, MTS 500 might enable tenants to store customer contact information (e.g., a customer's website, email address, telephone number, and social media data), identify sales opportunities, record service issues, and manage marketing campaigns. Furthermore, MTS 500 may enable those tenants to identify how customers have been communicated with, what the customers have bought, when the customers last purchased items, and what the customers paid. To provide the services of a CRM system and/or other services, as shown, MTS 500 includes a database platform 510 and an application platform 520.

Database platform 510, in various embodiments, is a combination of hardware elements and software routines that implement database services for storing and managing data of MTS 500, including tenant data. As shown, database platform 510 includes data storage 512. Data storage 512, in various embodiments, includes a set of storage devices (e.g., solid state drives, hard disk drives, etc.) that are connected together on a network (e.g., a storage attached network (SAN)) and configured to redundantly store data to prevent data loss. Data storage 512 may implement a single database, a distributed database, a collection of distributed databases, a database with redundant online or offline backups or other redundancies, etc.

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 500 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, data storage 512 is organized as part of a log-structured merge-tree (LSM tree). As noted above, a database server 514 may initially write database records into a local in-memory buffer data structure before later flushing those records to the persistent storage (e.g., in data storage 512). As part of flushing database records, the database server 514 may write the database records into new files/extents that are included in a "top" level of the LSM tree. Over time, the database records may be rewritten by database servers 514 into new files included in lower levels as the database records are moved down the levels of the LSM tree. In various implementations, as database records age and are moved down the LSM tree, they are moved to slower and slower storage devices (e.g., from a solid-state drive to a hard disk drive) of data storage 512.

When a database server 514 wishes to access a database record for a particular key, the database server 514 may traverse the different levels of the LSM tree for files that potentially include a database record for that particular key. If the database server 514 determines that a file may include a relevant database record, the database server 514 may fetch the file from data storage 512 into a memory of the database server 514. The database server 514 may then check the fetched file for a database record having the particular key. In various embodiments, database records are immutable once written to data storage 512. Accordingly, if the database server 514 wishes to modify the value of a row of a table (which may be identified from the accessed database record), the database server 514 writes out a new database record into the buffer data structure, which is purged to the top level of the LSM tree. Over time, that database record is merged down the levels of the LSM tree. Accordingly, the LSM tree may store various database records for a database key such that the older database records for that key are located in lower levels of the LSM tree then newer database records.

Database servers 514, in various embodiments, are hardware elements, software routines, or a combination thereof capable of providing database services, such as data storage, data retrieval, and/or data manipulation Such database services may be provided by database servers 514 to components (e.g., application servers 522) within MTS 500 and to components external to MTS 500. As an example, a database server 514 may receive a database transaction request from an application server 522 that is requesting data to be written to or read from data storage 512. The database transaction request may specify an SQL SELECT command to select one or more rows from one or more database tables. The contents of a row may be defined in a database record and thus database server 514 may locate and return one or more database records that correspond to the selected one or more table rows. In various cases, the database transaction request may instruct database server 514 to write one or more database records for the LSM tree-database servers 514 maintain the LSM tree implemented on database platform 510. In some embodiments, database servers 514 implement a relational database management system (RDMS) or object-oriented database management system (OODBMS) that facilitates storage and retrieval of information against data storage 512. In various cases, database servers 514 may communicate with each other to facilitate the processing of transactions. For example, database server 514A may communicate with database server 514N to determine if database server 514N has written a database record into its in-memory buffer for a particular key.

Application platform 520, in various embodiments, is a combination of hardware elements and software routines that implement and execute CRM software applications as well as provide related data, code, forms, web pages and other information to and from user systems 550 and store related data, objects, web page content, and other tenant information via database platform 510. In order to facilitate these services, in various embodiments, application platform 520 communicates with database platform 510 to store, access, and manipulate data. In some instances, application platform 520 may communicate with database platform 510 via different network connections. For example, one application server 522 may be coupled via a local area network and another application server 522 may be coupled via a direct network link. Transfer Control Protocol and Internet Protocol (TCP/IP) are exemplary protocols for communicating between application platform 520 and database platform 510, however, it will be apparent to those skilled in the art that other transport protocols may be used depending on the network interconnect used.

Application servers 522, in various embodiments, are hardware elements, software routines, or a combination thereof capable of providing services of application platform 520, including processing requests received from tenants of MTS 500. Application servers 522, in various embodiments, can spawn environments 524 that are usable for various purposes, such as providing functionality for developers to develop, execute, and manage applications. Data may be transferred into an environment 524 from another environment 524 and/or from database platform 510. In some cases, environments 524 cannot access data from other environments 524 unless such data is expressly shared. In some embodiments, multiple environments 524 can be associated with a single tenant.

Application platform 520 may provide user systems 550 access to multiple, different hosted (standard and/or custom) applications, including a CRM application and/or applications developed by tenants. In various embodiments, application platform 520 may manage creation of the applications, testing of the applications, storage of the applications into database objects at data storage 512, execution of the applications in an environment 524 (e.g., a virtual machine of a process space), or any combination thereof. In some embodiments, application platform 520 may add and remove application servers 522 from a server pool at any time for any reason, there may be no server affinity for a user and/or organization to a specific application server 522. In some embodiments, an interface system (not shown) implementing a load balancing function (e.g., an F6 Big-IP load balancer) is located between the application servers 522 and the user systems 550 and is configured to distribute requests to the application servers 522. In some embodiments, the load balancer uses a least connections algorithm to route user requests to the application servers 522. Other examples of load balancing algorithms, such as are round robin and observed response time, also can be used. For example, in certain embodiments, three consecutive requests from the same user could hit three different servers 522, and three requests from different users could hit the same server 522.

In some embodiments, MTS 500 provides security mechanisms, such as encryption, to keep each tenant's data separate unless the data is shared. If more than one server 514 or 522 is used, they may be located in close proximity to one another (e.g., in a server farm located in a single building or campus), or they may be distributed at locations remote from one another (e.g., one or more servers 514 located in city A and one or more servers 522 located in city B). Accordingly, MTS 500 may include one or more logically and/or physically connected servers distributed locally or across one or more geographic locations.

One or more users (e.g., via user systems 550) may interact with MTS 500 via network 540. User system 550 may correspond to, for example, a tenant of MTS 500, a provider (e.g., an administrator) of MTS 500, or a third party. Each user system 550 may be a desktop personal computer, workstation, laptop, PDA, cell phone, or any Wireless Access Protocol (WAP) enabled device or any other computing device capable of interfacing directly or indirectly to the Internet or other network connection. User system 550 may include dedicated hardware configured to interface with MTS 500 over network 540. User system 550 may execute a graphical user interface (GUI) corresponding to MTS 500, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 550 to access, process, and view information and pages available to it from MTS 500 over network 540. Each user system 550 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 500 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 550 may be users in differing capacities, the capacity of a particular user system 550 might be determined one or more permission levels associated with the current user. For example, when a salesperson is using a particular user system 550 to interact with MTS 500, that user system 550 may have capacities (e.g., user privileges) allotted to that salesperson. But when an administrator is using the same user system 550 to interact with MTS 500, the user system 550 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 500 that are allocated at the tenant level while other data structures are managed at the user level.

In some embodiments, a user system 550 and its components are configurable using applications, such as a browser, that include computer code executable on one or more processing elements. Similarly, in some embodiments, MTS 500 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 540 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 550 may communicate with MTS 500 using TCP/IP and, at a higher network level, use other common Internet protocols to communicate, such as HTTP, FTP, AFS, WAP, etc. For example, where HTTP is used, user system 550 might include an HTTP client commonly referred to as a "browser" for sending and receiving HTTP messages from an HTTP server at MTS 500. Such a server might be implemented as the sole network interface between MTS 500 and network 540, but other techniques might be used as well or instead. In some implementations, the interface between MTS 500 and network 540 includes load sharing functionality, such as round-robin HTTP request distributors to balance loads and distribute incoming HTTP requests evenly over a plurality of servers.

In various embodiments, user systems 550 communicate with application servers 522 to request and update system-level and tenant-level data from MTS 500 that may require one or more queries to data storage 512. In some embodiments, MTS 500 automatically generates one or more SQL statements (the SQL query) designed to access the desired information. In some cases, user systems 550 may generate requests having a specific format corresponding to at least a portion of MTS 500. As an example, user systems 550 may request to move data objects into a particular environment 524 using an object notation that describes an object relationship mapping (e.g., a JavaScript object notation mapping) of the specified plurality of objects.

The various techniques described herein and all disclosed or suggested variations, may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, systems that implement the methods described with respect to any of the disclosed techniques are also contemplated. One such environment in which the disclosed techniques may operate is a cloud computer system. A cloud computer system (or cloud computing system) refers to a computer system that provides on-demand availability of computer system resources without direct management by a user. These resources can include servers, storage, databases, networking, software, analytics, etc. Users typically pay only for those cloud services that are being used, which can, in many instances, lead to reduced operating costs. Various types of cloud service models are possible. The Software as a Service (SaaS) model provides users with a complete product that is run and managed by a cloud provider. The Platform as a Service (PaaS) model allows for deployment and management of applications, without users having to manage the underlying infrastructure. The Infrastructure as a Service (IaaS) model allows more flexibility by permitting users to control access to networking features, computers (virtual or dedicated hardware), and data storage space. Cloud computer systems can run applications in various computing zones that are isolated from one another. These zones can be within a single or multiple geographic regions.

A cloud computer system includes various hardware components along with software to manage those components and provide an interface to users. These hardware components include a processor subsystem, which can include multiple processor circuits, storage, and I/O circuitry, all connected via interconnect circuitry. Cloud computer systems thus can be thought of as server computer systems with associated storage that can perform various types of applications for users as well as provide supporting services (security, load balancing, user interface, etc.).

One common component of a cloud computing system is a data center. As is understood in the art, a data center is a physical computer facility that organizations use to house their critical applications and data. A data center's design is based on a network of computing and storage resources that enable the delivery of shared applications and data.

The term "data center" is intended to cover a wide range of implementations, including traditional on-premises physical servers to virtual networks that support applications and workloads across pools of physical infrastructure and into a multi-cloud environment. In current environments, data exists and is connected across multiple data centers, the edge, and public and private clouds. A data center can frequently communicate across these multiple sites, both on-premises and in the cloud. Even the public cloud is a collection of data centers. When applications are hosted in the cloud, they are using data center resources from the cloud provider. Data centers are commonly used to support a variety of enterprise applications and activities, including, email and file sharing, productivity applications, customer relationship management (CRM), enterprise resource planning (ERP) and databases, big data, artificial intelligence, machine learning, virtual desktops, communications and collaboration services.

Data centers commonly include routers, switches, firewalls, storage systems, servers, and application delivery controllers. Because these components frequently store and manage business-critical data and applications, data center security is critical in data center design. These components operate together to provide the core infrastructure for a data center: network infrastructure, storage infrastructure and computing resources. The network infrastructure connects servers (physical and virtualized), data center services, storage, and external connectivity to end-user locations. Storage systems are used to store the data that is the fuel of the data center. In contrast, applications can be considered to be the engines of a data center. Computing resources include servers that provide the processing, memory, local storage, and network connectivity that drive applications. Data centers commonly utilize additional infrastructure to support the center's hardware and software. These include power subsystems, uninterruptible power supplies (UPS), ventilation, cooling systems, fire suppression, backup generators, and connections to external networks.

Data center services are typically deployed to protect the performance and integrity of the core data center components. Data center therefore commonly use network security appliances that provide firewall and intrusion protection capabilities to safeguard the data center. Data centers also maintain application performance by providing application resiliency and availability via automatic failover and load balancing.

One standard for data center design and data center infrastructure is ANSI/TIA-942. It includes standards for ANSI/TIA-942-ready certification, which ensures compliance with one of four categories of data center tiers rated for levels of redundancy and fault tolerance. A Tier 1 (basic) data center offers limited protection against physical events. It has single-capacity components and a single, nonredundant distribution path. A Tier 2 data center offers improved protection against physical events. It has redundant-capacity components and a single, nonredundant distribution path. A Tier 3 data center protects against virtually all physical events, providing redundant-capacity components and multiple independent distribution paths. Each component can be removed or replaced without disrupting services to end users. A Tier 4 data center provides the highest levels of fault tolerance and redundancy. Redundant-capacity components and multiple independent distribution paths enable concurrent maintainability and one fault anywhere in the installation without causing downtime.

Many types of data centers and service models are available. A data center classification depends on whether it is owned by one or many organizations, how it fits (if at all) into the topology of other data centers, the technologies used for computing and storage, and its energy efficiency. There are four main types of data centers. Enterprise data centers are built, owned, and operated by companies and are optimized for their end users. In many cases, they are housed on a corporate campus. Managed services data centers are managed by a third party (or a managed services provider) on behalf of a company. The company leases the equipment and infrastructure instead of buying it. In colocation ("colo") data centers, a company rents space within a data center owned by others and located off company premises. The colocation data center hosts the infrastructure: building, cooling, bandwidth, security, etc., while the company provides and manages the components, including servers, storage, and firewalls. Cloud data centers are an off-premises form of data center in which data and applications are hosted by a cloud services provider such as AMAZON WEB SERVICES (AWS), MICROSOFT (AZURE), or IBM Cloud.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Where appropriate, it is also contemplated that claims drafted in one format or statutory type (e.g., apparatus) are intended to support corresponding claims of another format or statutory type (e.g., method).

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

What is claimed is:

1. A method, comprising:

receiving, by a database system, a query that defines a first database transaction associated with a first snapshot of a database, wherein the first database transaction includes a read of a database value from the database and an update of the database value in the database;

determining, by the database system, whether the query satisfies a set of criteria that allows a relaxation of a requirement to perform the first database transaction using the first snapshot of the database; and in response to identifying a contention over the database value between the first database transaction and a second database transaction, permitting, by the database system, performance of the first database transaction to use a second subsequent snapshot of the database based on the determining allowing the relaxation of the requirement to use the first snapshot; and wherein the database system is configured to indicate, in response to identifying the contention, a failure of the first database transaction based on a determination that the relaxation of the requirement is not allowed.

2. The method of claim 1, wherein identifying the contention over the database value includes determining whether a lock associated with the database value has already been acquired by the second database transaction.

3. The method of claim 2, further comprising:

in response to determining that the lock associated with the database value has already been acquired by the second database transaction, waiting for the lock to be released by the second database transaction; and acquiring the lock by the first database transaction upon release of the lock, wherein the second subsequent snapshot of the database is identified based on when the lock is acquired by the first database transaction.

4. The method of claim 3, further comprising:

releasing the lock by the first database transaction upon completion of the first database transaction.

5. The method of claim 1, wherein the set of criteria comprises:

a first requirement that the first database transaction accesses a single row of the database that includes the database value.

6. The method of claim 5, wherein the set of criteria comprises:

a second requirement that the first database transaction is deterministic with respect to a location of the database value being accessed.

7. The method of claim 1, wherein the set of criteria is determined by a query planner of the database prior to performing the first database transaction.

8. The method of claim 7, further comprising:

granting, via the query planner, a snapshot advancement permission to an execution engine of the database, wherein the execution engine performs the first database transaction using the second subsequent snapshot of the database.

9. The method of claim 1, further comprising:

receiving a second query that defines a third database transaction;

determining that the second query does not satisfy the set of criteria; and in response to identifying a second contention between the third database transaction and a fourth database transaction, restarting the third database transaction.

10. The method of claim 9, wherein the restarting of the third database transaction includes indicating to an application layer that supplied the second query to resubmit the second query.

11. A non-transitory computer-readable medium having program instructions stored thereon that are capable of causing a computer system to perform operations comprising:

receiving, by a query planner of a database, a query that defines a first database transaction that includes reading and updating a database value in the database;

determining, by the query planner, that the query satisfies a set of criteria that allows a snapshot advancement from a first snapshot of the database to a second snapshot of the database; and based on the determining, providing, by the query planner and to an execution engine of the database, a snapshot advancement permission, wherein the snapshot advancement permission allows a relaxation of a requirement to perform the first database transaction using the first snapshot of the database such that:

with the snapshot advancement permission, authorizes the execution engine is authorized to execute the query using the second snapshot in response to determining that a contention exists with a second database transaction over an instance of the database value associated with the first snapshot; and without the snapshot advancement permission, the execution engine indicates a failure of the first database transaction in response to determining that the contention exists.

12. The non-transitory computer-readable medium of claim 11, wherein determining that the contention exists with the second database transaction includes determining whether a lock associated with the instance of the database value associated with the first snapshot has already been acquired by the second database transaction.

13. The non-transitory computer-readable medium of claim 12, wherein the operations further comprise:

in response to determining that the lock associated with the instance of the database value associated with the first snapshot has already been acquired by the second database transaction, waiting for the lock to be released by the second database transaction; and acquiring the lock by the first database transaction upon its release, wherein the second snapshot of the database is identified based on a time at which the lock is acquired by the first database transaction.

14. The non-transitory computer-readable medium of claim 11, wherein the set of criteria comprises:

a first requirement that the first database transaction accesses a single row of the database that includes the instance of the database value.

15. The non-transitory computer-readable medium of claim 14, wherein the set of criteria comprises:

a second requirement that the first database transaction is deterministic with respect to a location of the instance of the database value being accessed.

16. A system, comprising:

at least one processor; and memory having program instructions stored thereon that are executable by the at least one processor to implement a database system performing operations including:

initiating, by an execution engine of a database, an execution of a query for a first database transaction using a first snapshot of the database, wherein the first database transaction includes a read of a database value and a modification of the database value;

during the execution of the query, determining, by the execution engine, that an instance of the database value associated with the first snapshot is contended by a second database transaction; and in response to an authorization from a query planner of the database, continuing the execution of the query for the first database transaction using a second subsequent snapshot of the database and without restarting the execution of the query, wherein the authorization allows a relaxation of a requirement to perform the first database transaction using the first snapshot of the database such that, without the authorization, the execution engine indicates a failure of the first database transaction in response to determining that the instance of the database value associated with the first snapshot is contended by the second database transaction.

17. The system of claim 16, wherein determining that the instance of the database value associated with the first snapshot of the database is contended by the second database transaction includes determining whether a lock associated with the instance of the database value has already been acquired by the second database transaction.

18. The system of claim 17, wherein the operations further comprise:

in response to determining that the lock associated with the instance of the database value associated with the first snapshot has already been acquired by the second database transaction, waiting for the lock to be released by the second database transaction; and acquiring the lock by the first database transaction upon its release, wherein the execution of the first database transaction continues using the second snapshot of the database, wherein the second snapshot of the database is identified based on a time at which the lock is acquired by the first database transaction.

19. The system of claim 16, wherein the operations further comprise:

receiving the authorization in response to a first requirement that the first database transaction operates on a single row of the database that contains the database value.

20. The system of claim 19, wherein the operations further comprise:

receiving the authorization in response to a second requirement that the first database transaction is predictable with respect to a location of the database value being accessed.

* * * * *